H. J. GRELL.
CREAM RIPENER.
APPLICATION FILED AUG. 17, 1910.

990,352.

Patented Apr. 25, 1911.

WITNESSES.
T. H. Theuer
Laura A. Kelley

INVENTOR.
Henry J. Grell
By Benedict, Morsell & Caldwell
ATTORNEYS.

THE NORRIS PETERS CO., WASHINGTON, D. C.

UNITED STATES PATENT OFFICE.

HENRY J. GRELL, OF JOHNSON CREEK, WISCONSIN.

CREAM-RIPENER.

990,352.

Specification of Letters Patent.  Patented Apr. 25, 1911.

Application filed August 17, 1910. Serial No. 577,577.

*To all whom it may concern:*

Be it known that I, HENRY J. GRELL, residing in Johnson Creek, in the county of Jefferson and State of Wisconsin, have invented new and useful Improvements in Cream-Ripeners, of which the following is a description, reference being had to the accompanying drawings, which are a part of this specification.

This invention has for its object to provide a cream ripener with a cooling drum and cooling coils traveling around the drum, the coils and drum being adapted to have a cooling medium circulating therethrough to control the temperature of the cream.

With the above and other objects in view the invention consists in the cream ripener herein claimed, its parts and combinations of parts and all equivalents.

Figure 1:
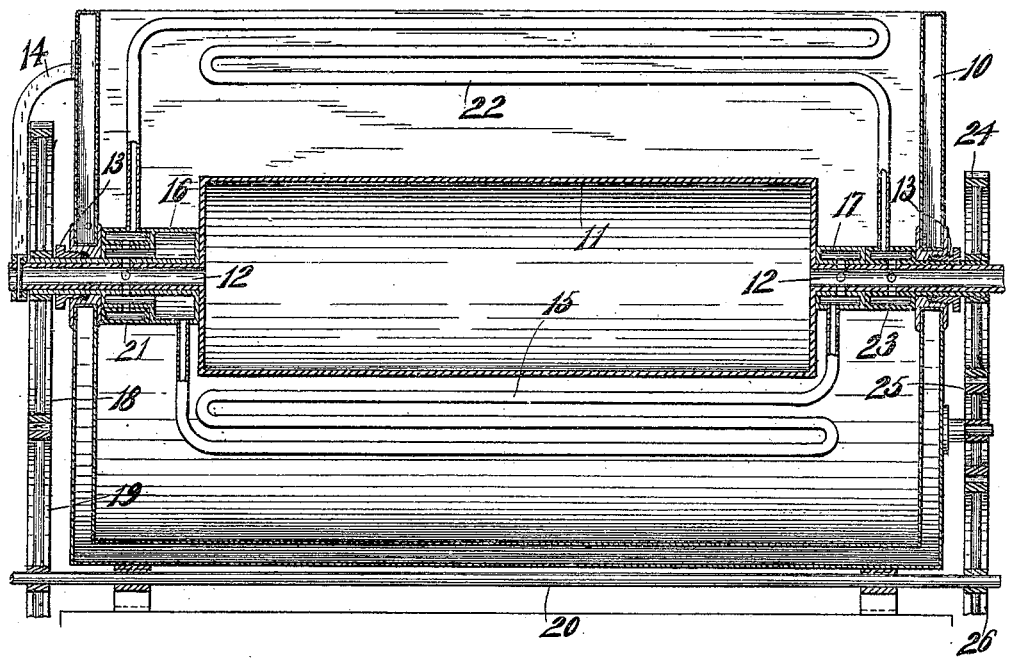

Referring to the accompanying drawing in which like characters of reference indicate similar parts in the different views: Figure 1 is a central sectional elevation of a cream ripener constructed in accordance with this invention and provided with a stationary drum and cooling coils turning thereabout in opposite directions; and, Fig. 2 is a similar view of a modified form thereof, the drum turning in one direction and the cooling coils in the opposite direction.

In these drawings 10 indicates a vat provided with double walls for heat insulation and adapted to contain water between the walls for assisting in the modification of the temperature of the contents of the vat. A cylindrical drum 11 is mounted on tubular trunnions 12 in liquid tight bushings or packing glands 13 at the ends of the vat and in that form of the invention shown in Fig. 1 is held against turning by means of a bracket arm 14. The drum is adapted to have one tubular trunnion connected with a source of water supply and the other trunnion connected with a waste pipe so that water or another temperature regulating medium may be passed therethrough.

A cooling pipe 15, preferably bent into a sinuous or coiled form has its two ends connected to hollow sleeves 16 and 17 respectively which rotatably fit upon the tubular trunnions 12 and communicate with the interior thereof through registering openings. The hollow sleeve 16 is provided with a reduced portion and also an extension which passes out through the bushing 13 with a gear wheel 18 mounted thereon. The gear wheel 18 meshes with a gear wheel 19 on a drive shaft 20 so that the turning movements of the shaft produce turning movements of the cooling coil 15. On the reduced portion of the hollow sleeve 16 is rotatably fitted a hollow sleeve 21 having openings registering with openings of the sleeve 16 to communicate therewith and forming an end connection for a cooling coil 22 at a greater distance from the drum than coil 15 so as to be able to clear said coil 15. The other end of coil 22 is connected to a hollow sleeve 23 on the trunnion at the other end of the vat from sleeve 21, and this sleeve communicates with the tubular trunnion through registering openings and has an extension passing through the bushing 13 with a gear wheel 24 thereon meshing with an idle gear 25 in mesh with a gear wheel 26 on the shaft 20, so that the coil 22 is driven from the shaft 20 in the opposite direction from the direction of movement of the coil 15. By reason of the registering openings forming communications between the tubular trunnions and the hollow sleeves the cooling water is caused to circulate through the coils 15 and 22 as well as through the drum 11.

Figure 2:
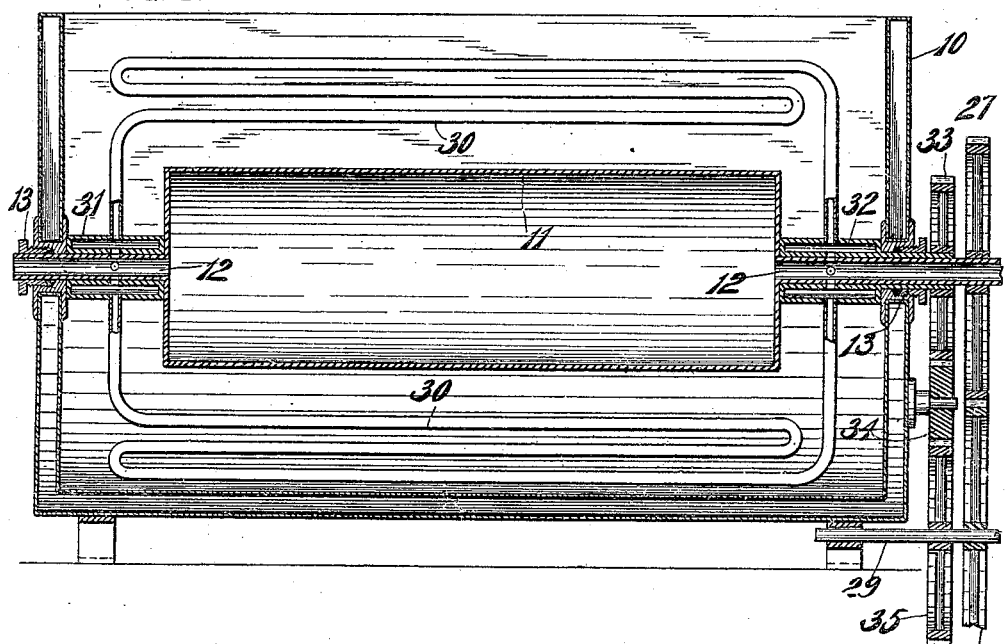

It is obvious that various modifications may be made in the arrangement of parts, one of such being shown in Fig. 2, where the drum 11 is rotated in one direction by having a gear wheel 27 thereon meshing with a gear wheel 28 on a drive shaft 29 and the two coils 30 are connected in common to hollow sleeves 31 and 32 respectively having communication through registering openings with the interior of the hollow trunnions 12. The latter hollow sleeve, 32, has an extension on which is mounted a gear wheel 33 meshing with an idler 34 driven by a gear wheel 35 on the drive shaft 29 so that the coils 30 are turned in an opposite direction from the drum 11.

In operation the cream contained in the vat may have its temperature lowered by passing cold water through the drum and the rotating coils which move slowly therethrough to keep the cream in gentle circulation and come in contact with all parts thereof, the drum besides affording a cooling surface occupying the central space where the motion imparted to the cream by the movements of the coils would be the least and thus results in a more uniform action upon the entire body of cream. The temperature of the cream may be controlled as desired by varying the temperature of the water circulating through the drum and the coils.

What I claim as new and desire to secure by Letters Patent is—

1. A cream ripener, comprising a vat, a drum mounted therein, and a coil mounted to rotate around the drum, said drum and coil having water circulating therethrough.

2. A cream ripener, comprising a vat, a drum centrally located in the vat with water circulating therethrough, and a coil revolving about the drum and having a circulation of water therethrough.

3. A cream ripener, comprising a vat, a drum contained therein, tubular trunnions on the drum passing through the walls of the vat, hollow sleeves fitting on the tubular trunnions, there being registering openings in the trunnion and the hollow sleeves to provide communication therebetween, a coil with its ends connected to the hollow sleeves, one of the hollow sleeves having an extension passing out through the wall of the vat, and means on the extension for turning the coil.

4. A cream ripener, comprising a vat, a drum contained therein, tubular trunnions on the drum, bushings in the walls of the vat through which the tubular trunnions pass, hollow sleeves rotatably mounted on the trunnions and having communication with the interior thereof, a pipe coil with its ends connected with the hollow sleeves, one of the hollow sleeves having an extension passing out of the vat between the tubular trunnion and the bushing, and means on the extension for turning the coil.

5. A cream ripener, comprising a vat, a drum contained therein, bushings in the walls of the vat, tubular trunnions on the drum passing through the bushings, a pair of pipe coils rotatably mounted on the tubular trunnions and communicating with the interior thereof, and means for rotating the drum in one direction and the pipe coils in the opposite direction.

In testimony whereof, I affix my signature, in presence of two witnesses.

HENRY J. GRELL.

Witnesses:
F. R. SCHOLL,
W. H. GRELL.

---

Copies of this patent may be obtained for five cents each, by addressing the "Commissioner of Patents, Washington, D. C."